United States Patent [19]

Harase

[11] Patent Number: 4,758,909
[45] Date of Patent: Jul. 19, 1988

[54] MAGNETIC RECORDING OR REPRODUCING DEVICE

[75] Inventor: Toshikatu Harase, Ashigarakami, Japan

[73] Assignee: Fuji Photo Film Co., Ltd., Kanagawa, Japan

[21] Appl. No.: 806,478

[22] Filed: Dec. 9, 1985

[30] Foreign Application Priority Data

Dec. 13, 1984 [JP] Japan .................................. 59-263511
Dec. 13, 1984 [JP] Japan .......................... 59-189104[U]

[51] Int. Cl.⁴ .............................................. G11B 5/55
[52] U.S. Cl. ...................................... 360/106; 360/97
[58] Field of Search ................................ 360/97–99, 360/104–106

[56] References Cited

U.S. PATENT DOCUMENTS 4,200,894 4/1980 Kaseta et al. ..................... 360/97 X
4,399,477 8/1983 Bryer ................................... 360/106
4,419,707 12/1983 Woodier ............................ 360/106
4,456,937 6/1984 Iftikar et al. ....................... 360/106
4,491,890 1/1985 Rudi ................................... 360/106

*Primary Examiner*—John H. Wolff
*Attorney, Agent, or Firm*—Parkhurst & Oliff

[57] ABSTRACT

A magnetic recording or reproducing device applicable to a magnetic recorder-reproducer in an electronic camera system wherein a subject is electronically still-photographed and recorded on a rotating magnetic disk, and the reproduction of an image is carried out by a television set or a printer.

In the magnetic recording or reproducing device, a belt is provided on a head carriage carrying a magnetic head and this belt is clampedly held by a capstan and a pinch roller to feed the head carriage, so that the magnetic head can be finely fed with high accuracy using simplified apparatus.

6 Claims, 5 Drawing Sheets

MAGNETIC RECORDING OR REPRODUCING DEVICE

BACKGROUND OF THE INVENTION

1. Field of the Invention

This invention relates to a rotary magnetic disk device, and more particularly to a rotary magnetic disk device used in a magnetic recording-reproducing apparatus for an electronic still camera and the like.

2. Description of the Prior Art

Recently developed electronic still camera systems utilize an image pickup device such as a solid state image sensing device or an image pickup tube combined with a recording device using an inexpensive magnetic disk as a recording medium. Such devices have a comparatively high memory capacity. In the operation of such camera systems, a subject is electronically still-photographed and recorded onto a rotating magnetic disk, and the reproduction of an image is carried out by a television, a printer or the like, which are provided separately.

The magnetic disk used in the above-described camera system is normally used in the form of a magnetic disk pack. The magnetic disk pack is rotatably provided therein with the magnetic disk for magnetically recording still image information and the like, and the magnetic disk pack is mounted for use with a feeder of a magnetic head assembled in an electronic camera.

In the image recording-reproducing system using the magnetic disk of the type described, a magnetic disk having a diameter of about 50 mm is used, on which there is formed a recording pattern of from 1 to 52 tracks from the outer periphery to the inner periphery of the magnetic disk. In the magnetic recording-reproducing apparatus of the type described, the feed pitch of the magnetic head is as low as about 100 $\mu$m, which is far smaller than the feed pitch of an ordinary floppy disc. In consequence, the magnetic head should be moved with very high accuracy.

Heretofore, as the feeder of the magnetic head, an arrangement has been used wherein a head carriage having secured thereto the magnetic head is guided by guide bars and is threadably coupled to a lead screw, which lead screw is rotated to finely feed the magnetic head. However, if the lead screw were to be made with sufficiently high accuracy so as to satisfy the requirement for the feed of the magnetic head for recording image signals, the lead screw would become so expensive as to be impracticable.

Further, as another feeder of the magnetic head, there has been proposed an arrangement wherein the head carriage provided with the magnetic head is guided by the guide bars, one end of a steel belt fixed to the head carriage is wound around a pulley connected to an output shaft of a stepping motor in an $\alpha$ shape, and the other end of the steel belt is fixed to the head carriage. In this feeder the pulley is rotated to move the magnetic head. In order to finely feed the magnetic head, it is necessary to reduce the diameter of the pulley. However, if the diameter of the pulley is reduced, then the durability of the steel belt can be reduced. Furthermore, in this feeder of the magnetic head, in order to finely feed the magnetic head, it may be proposed to reduce an angle of driving of the stepping motor. However, there is a limit to this in practice. To finely feed the magnetic head, it may also be proposed to provide a speed reducer for obtaining a high reduction ratio between the pulley and the stepping motor. However, the speed reducer can be complicated in construction and the accuracy of feed can be reduced.

It is necessary to detect a movement value of the above-described magnetic head, and for this purpose, a movement value sensor for the magnetic head is provided. Heretofore, the movement value sensor for the magnetic head has comprised a slit plate formed with a plurality of slits at regular intervals. The slit plate is fixed to the head carriage provided with the magnetic head, and a movement value of the magnetic head is detected from a movement of the slit plate due to the movement of the head carriage. However, with such a conventional movement value sensor for the magnetic head, the feeder becomes disadvantageously complicated in construction.

SUMMARY OF THE INVENTION

The present invention has been developed to obviate the above-described disadvantages of the prior art and has as its object the provision of a magnetic recording or reproducing device, which can feed the magnetic head with very high accuracy.

To this end, the present invention contemplates that, in a magnetic recording or reproducing device in which a magnetic head is moved in the radial direction of a magnetic disk received in a magnetic disk pack to magnetically record or reproduce:

the feeder comprises a head carriage provided with the magnetic head and supported by guide members in a manner to be movable in the radial direction of the magnetic disk, a belt stretched on the head carriage in the moving direction of the head carriage, a shaft member disposed in contact with the belt on one side of the belt and connected to a rotary driving source, and a pressure roller disposed at a position opposed to the shaft member on the other side of the belt and urged against the belt so that the belt is held in clamped relationship by the shaft member and the pressure roller, and the shaft member is rotated to move the head carriage.

Furthermore, another object of the present invention is to provide a magnetic recording or reproducing device wherein the movement value sensor for the magnetic head is simplified in construction.

To this end, the present invention contemplates that, in a magnetic recording or reproducing device wherein the magnetic head moves in the radial direction of a magnetic disk received in a magnetic disk pack to magnetically record or reproduce, the device comprises:

a head carriage provided with the magnetic head and supported by guide members in a manner to be movable in the radial direction of the magnetic disk;

a belt stretched on the head carriage in the moving direction of the head carriage;

a rotary driving source for moving the head carriage using the belt;

marks regularly formed on the belt at predetermined intervals; and a sensor for detecting movement of the marks.

BRIEF DESCRIPTION OF THE DRAWINGS

The exact nature of this invention, as well as other objects and advantages thereof, will be readily apparent from consideration of the following specification with reference to the accompanying drawings, in which like reference characters designate the same or similar parts throughout the figures thereof, and wherein.

DETAILED DESCRIPTION OF THE INVENTION

A detailed description follows of the preferred embodiments of a magnetic recording or reproducing device according to the present invention with reference to the accompanying drawings.

Figure 1:
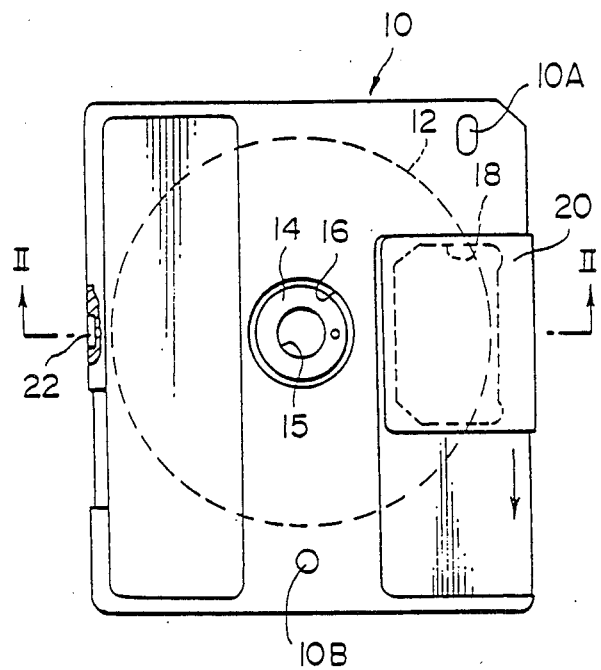
FIG. 1 is a plan view showing the magnetic disk pack used with the present invention.
Figure 2:
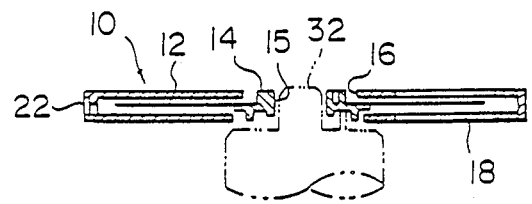
FIG. 2 is a sectional view of the magnetic disk pack, taken along the line II—II in FIG. 1.

FIG. 1 is a plan view showing the magnetic disk pack used in the magnetic recording-reproducing apparatus for an electric still camera and the like. FIG. 2 is a sectional view taken along the line II—II in FIG. 1. As shown in FIG. 1, the magnetic disk pack is formed in a generally square shape and rotatably provided therein with a magnetic disk 12 for magnetically recording still image information and the like. The magnetic disk 12 is provided in the central portion thereof with a center core 14 which serves as a reinforcing member, and which is exposed to the outside through a circular opening 16 in the magnetic disk pack 10. The magnetic disk pack 10 is formed with a window 18, at which is to be located a magnetic head to be described, hereinafter. Window 18 for the magnetic head is opened or closed by a slidable shutter 20. More specifically, before the magnetic disk pack 10 is inserted into a bucket or holder to be described hereinafter, the shutter 20 closes the window 18 to prevent dust from adhering to the magnetic disk 12. When the magnetic disk pack 10 is inserted into the holder to be described hereinafter, the shutter moves downward, as shown in FIG. 2, to open the window 18 for the magnetic head, so that recording on and reproduction from the magnetic disk 12 can be performed. An engageable recess 22 is formed at an end face opposite to the shutter 20 of the magnetic disk pack 10. This recess 22 is used as a provisional lock for the magnetic disk pack 10 when the magnetic disk 12 is inserted into the holder. Additionally, holes 10A and 10B, into which are inserted positioning pins to be described hereinafter, are provided for positioning the magnetic disk pack.

Figure 3:
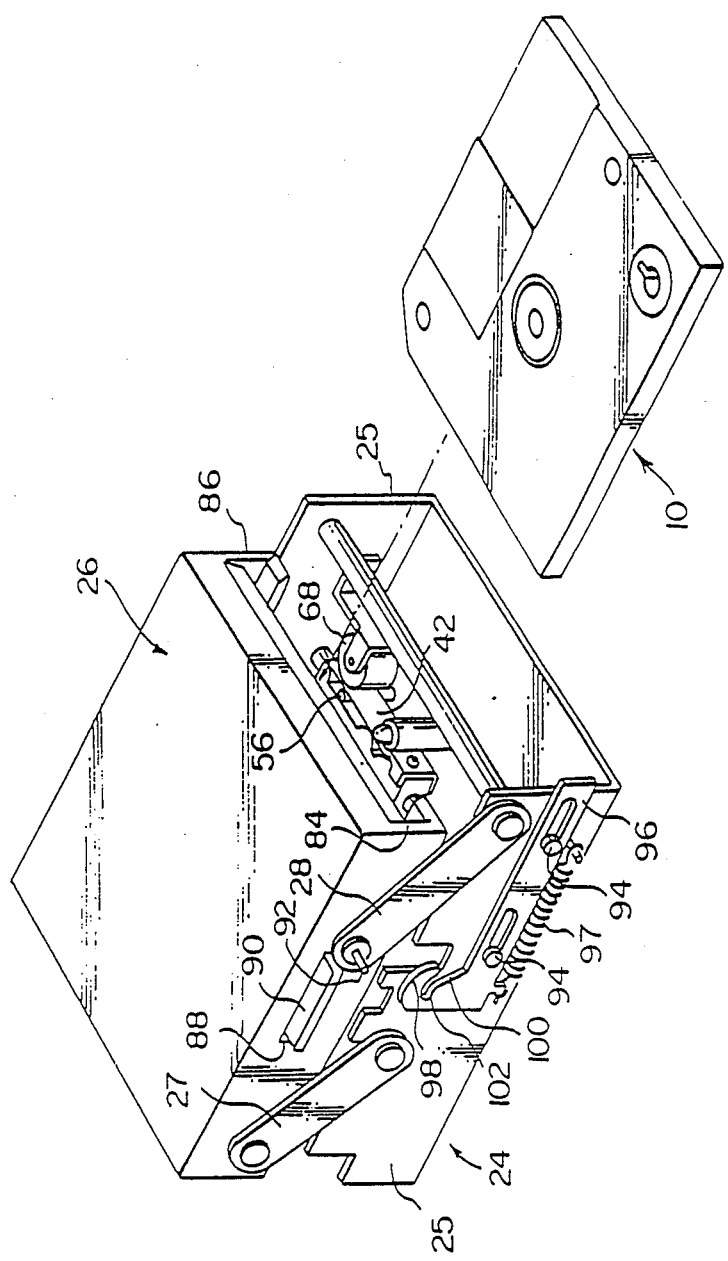
FIG. 3 is a perspective view showing the general arrangement of a first embodiment of the magnetic recording-reproducing apparatus of the present invention.
Figure 4:
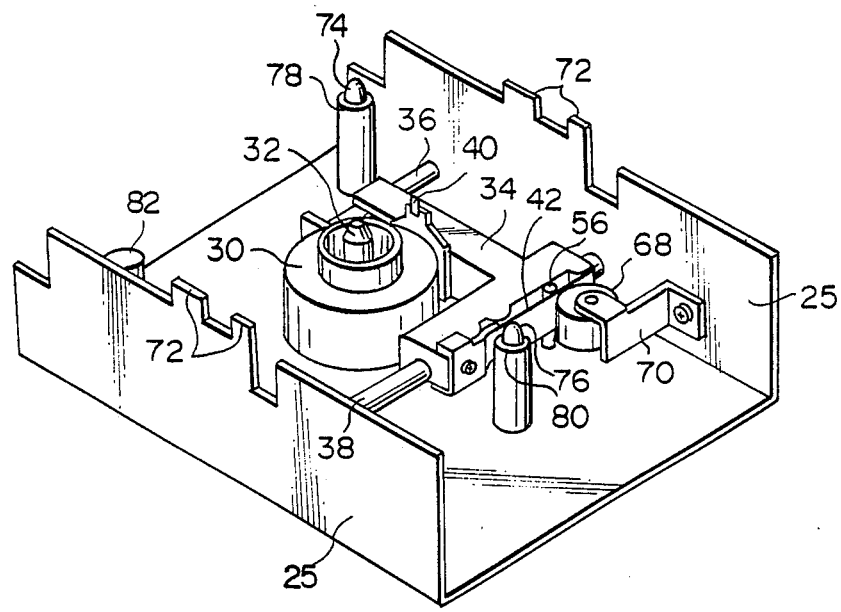
FIG. 4 is a perspective view showing the inner construction of the main body of the magnetic recording-reproducing apparatus shown in FIG. 3.

FIG. 3 shows a first embodiment of the magnetic recording-reproducing apparatus constructed in accordance with the present invention. The magnetic recording-reproducing apparatus includes a main body 24 and a holder 26. The holder 26 is vertically movably mounted to the main body 24 of the apparatus through two pairs of equal-length links 27 and 28 on each side of main body 24 and holder 26, so that the holder 26 can move parallel to the main body 24 of the apparatus to make opening and closing operations. The inner construction of the main body 24 of the apparatus first be described with reference to FIG. 4. The main body 24 is provided in the central portion thereof with a motor 30 for driving the magnetic disk 12. A drive shaft 32 of this motor 30 extends into center hole 15 of center core 14 of the magnetic disk pack 10 as shown in FIG. 1 and rotates the magnetic disk 12 in disk pack 10 at a predetermined rotation rate. As shown in FIG. 4, also included within main body 24 are a head carriage 34, guide bars 36 and 38 for guiding the head carriage 34 and a magnetic head 40 secured to the head carriage 34.

Figure 5:
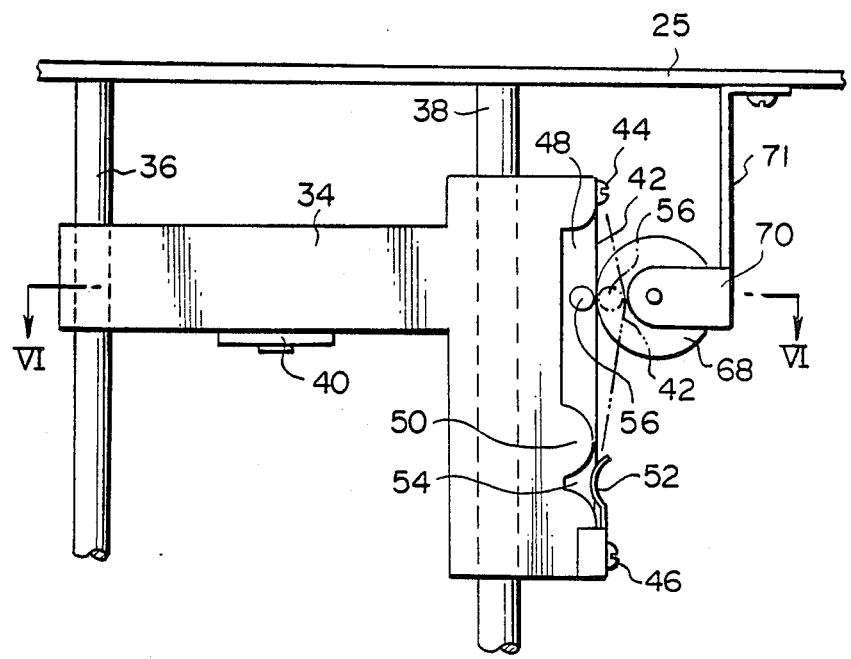
FIG. 5 is an enlarged partial top view of the embodiment shown in FIG. 3 showing the construction of the head carriage area.

As shown in FIG. 5, a steel belt 42 is fixedly secured across head carriage 34 so as to extend in the direction of movement of carriage 34 by screws 44 and 46. The end face of the head carriage 34 between screws 44 and 46 is formed to provide a recessed surface 48, and further, a circular arcuate belt engaging surface 50 and a further recess 54. Screw 46 also secures a belt presser 52 to head carriage 34 to opposite recess 54 to thereby tension the steel belt 42.

Figure 6:
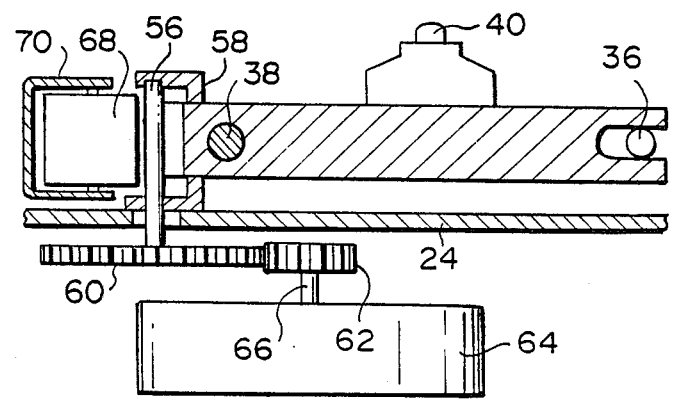
FIG. 6 is a sectional view taken along the line VI—VI in FIG. 5.

As further shown in FIG. 5, a capstan 56 is disposed in contact with the left or inner side of the steel belt 42. As shown in FIG. 6, the capstan 56 is pivotally supported on a U-shaped holder 58 provided on the main body 24 of the apparatus. As shown in FIG. 6, the bottom end portion of the capstan 56 is connected to an output shaft 66 of a stepping motor 64 through a large reduction gear 60 and a small reduction gear 62.

Provided at a position opposed to the capstan 56 and on the right or outer side of the steel belt is a pinch roller 68 made of aluminum or the like. More specifically, the pinch roller 68 is rotatably supported by a U-shaped holder 70 and the holder 70 is secured to a side wall 25 through a plate spring 71, such that the pinch roller 68 is urged against the capstan 56 through the resiliency of the plate spring 71, and the steel belt can be clampedly held by the capstan 56 and the pinch roller 68.

Furthermore, as shown in FIG. 4, formed on opposite side walls 25 and 25 of the main body 24 of the apparatus are a plurality of regulating plate holder receiving surfaces 72. Positioning pins 74, 76 for the magnetic disk pack 10 and magnetic disk pack receiving surfaces 78, 80 and 82 are also provided.

As shown in FIG. 3, opposite side edges 84 and 86 of the holder 26 are each bent into U-shaped channels which receive the magnetic disk pack 10. The opposite side edges 84 and 86 of the holder 26 are formed with windows 88 (in FIG. 3, only one side is shown), which receive a regulating plate holder 90 of a rectangular plate shape. The regulating plate holder 90 loosely fits within the windows 88 such that it can move along the gaps between holder 90 and windows 88. This regulating plate holder 90 is provided with a regulating plate, not shown, which is located at a position opposed to the magnetic head 40 through the magnetic disk 11 when the holder 26 is closed.

Furthermore, as shown in FIG. 3, a lock pin 92 projects from a top rotary fulcrum of the equal-length link 28 and, a slide key 96 is supported on a side wall 25 of the main body 24 of the apparatus by two pins 94 so as to be slidable in the direction of insertion of the magnetic disk pack 10. Slide key 96 is biased by a spring 97 in the direction of the inlet opening of the holder 26 (to the right in FIG. 3). Slide key 96 has a tapered portion 98 at the left end thereof (as shown in FIG. 3), and an inclined groove 100 is formed from the tail end portion of this tapered portion 98. Further, the left end of this inclined groove 100 communicates with a lateral groove 102. When the lock pin 92 is positioned at the inlet (at the right end) of inclined groove 100, the holder 26 is located at a position (overstroke position) slightly closer to the main body 24 than the normally closed position (recording-reproducing position), and thereafter, when the lock pin 92 ascends in the inclined groove 100 and is positioned in the lateral groove 102, the holder 26 is positioned at the normally closed position.

The foregoing embodiment of the magnetic head feeder according to the present invention operates as follows. First, in loading the magnetic disk pack, if the magnetic disk pack 10 is inserted into the holder 26 in the opened state of the holder 26 as shown in FIG. 3, then the magnetic disk pack 10 is provisionally locked in the holder 26 as described above. Subsequently, if the holder 26 in this state is pushed downwardly toward the main body 24 of the apparatus, then the lock pin 92 abuts against the tapered portion 98 of the slide key 96 to move the slide key 96 to the left in FIG. 3 against the biasing force of the spring 97, which causes the lock pin 92 to move into the inclined groove 100. When the lock pin 92 begins to enter the inclined groove 100, the position of the holder 26 is the overstroke position. Subsequently, when the lock pin 92 is positioned in the lateral groove 100, both the magnetic head 40 and the magnetic disk 12 are positioned in their magnetically recordable or reproducible relationship.

Because the steel belt is clampedly held by the capstan 56 and the pinch roller 68, when the capstan 56 is rotated by the stepping motor 64 through the reduction gears 60 and 62 the head carriage 34 can finely feed the magnetic head 40 in the radial direction of the magnetic sheet 12, depending upon the direction of rotation of the capstan 56.

In the above embodiment, the diameter of the capstan 56 can be made as small as 1.5 or 2 mm, for example, so that a high reduction ratio can be obtained with no use of a complicated speed reducer.

Furthermore, when the capstan 56 is set at a position slightly shifted to the right from the position of the steelbelt as indicted in dashed line in FIG. 5, a biasing force is created which urges the head carriage 34 to the right to be positioned to one side. Play between the guide shafts 36, 38 and the guide holes of the head carriage 34 is thus eliminated, thereby allowing the head carriage 34 to be finely fed with high accuracy.

If the steel belt 42 and the capstan 56 are provided with a non-slip finish such as fine knurling, then the head carriage 34 can be fed with still higher accuracy.

As described above, in the magnetic recording or reproducing device according to the present invention, the belt 42 is provided on the head carriage carrying the magnetic head, and this belt is clampedly held by the capstan and the pinch roller to feed the head carriage, so that the magnetic head can be finely fed with the simplified construction. Furthermore, a shaft of the capstan can be finished with high accuracy at a relatively low cost, so that a magnetic head feeder can be provided which is inexpensive compared with a conventional lead screw system and the like.

Figure 7:
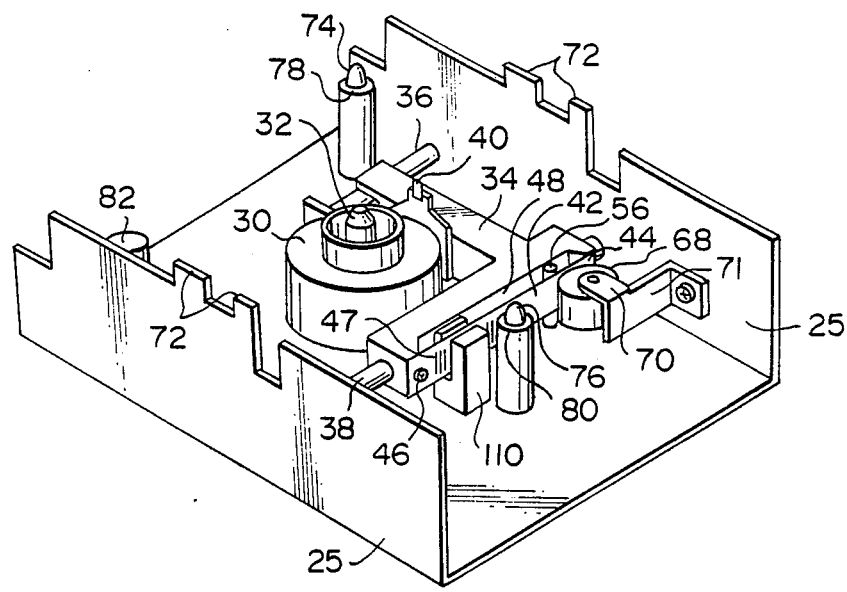
FIG. 7 is a perspective view showing the inner construction of the main body of a second embodiment of the recording-reproducing apparatus of the present invention.
Figure 8:
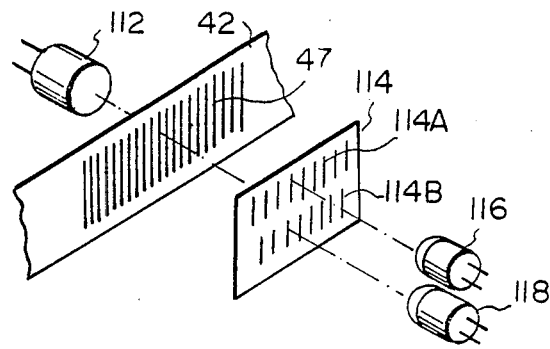
FIG. 8 is a perspective schematic view showing the shape of the sensor of the embodiment shown in FIG. 7.

FIGS. 7 and 8 show the construction of the second embodiment of the present invention.

The first and second embodiments have parts which are the same or similar and have been denoted with the same reference numerals in the respective figures. A detailed description of the corresponding parts in the second embodiment accordingly will not be repeated. The steel belt 42 in the second embodiment is formed with slits 47 spaced regularly at a predetermined pitch, and a sensor 110 is is disposed opposite a portion of these slits 47. As shown in FIG. 8, the sensor 110 includes a light emitting element 112 formed of an infrared ray LED (light emitting diode), a fixed slit plate 114 formed with two sets of slits 114A and 114B which are shifted laterally with repect to each other by a ¼ wavelength and which are arranged in two vertically spaced rows; and light receiving elements 116 and 118, which are disposed opposite the upper and the lower slits 114A and 114B, respectively.

The reason why the slits 114A and 114B of the fixed slit plate 114 are shifted by a ¼ wavelength is that the directional property of the movement of the head carriage 34 is to be inspected.

The foregoing second embodiment of the present invention operates as follows.

As the head carriage 34 moves, the transmitted light from the light emitting element 112 is changed by the movement of the slits 47, and this change in the transmitted light is detected by the light receiving elements 116 and 118. With this arrangement, the value and direction of the movement of the head carriage 34 may be found.

Figure 9:
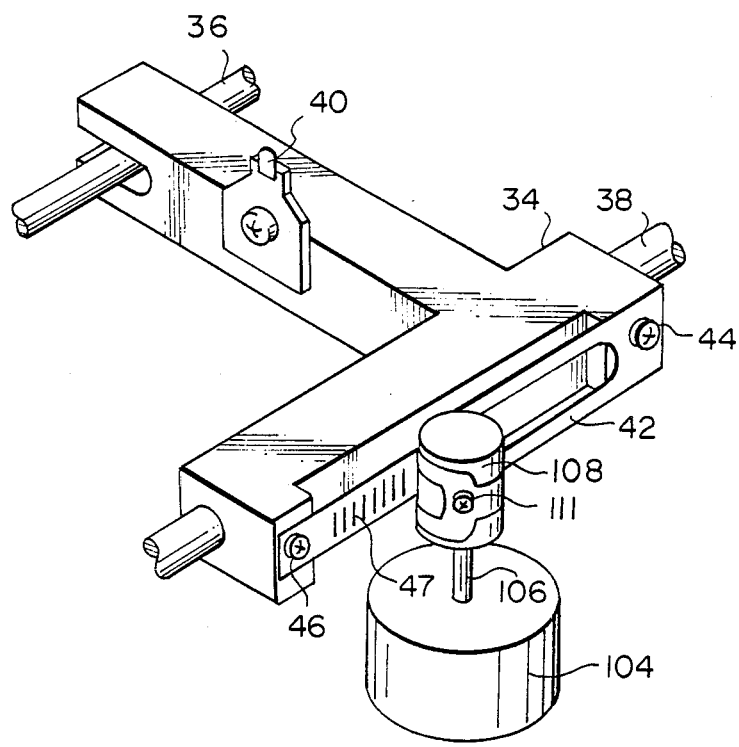
FIG. 9 is a perspective partial view showing the construction of another embodiment of the present invention.

FIG. 9 shows a construction of the third embodiment of the present invention. The second and third embodiments have parts which are the same or similar and have been denoted with the same reference numerals in the respective figures. A detailed description of the corresponding parts in the third embodiment accordingly will not be repeated. In the embodiment shown in FIGS. 7 and 8, the steel belt 42 is clampedly held by the capstan 56 and the pinch roller 68, and the capstan 56 is rotated to move the head carriage 34. However, in the embodiment shown in FIG. 9, the belt 42 is mounted to a pulley 108 connected to an output shaft 106 of a DC motor 104, whereby the head carriage 34 is moved. More specifically the belt 42 is solidly secured at opposite ends thereof to the head carriage 34 through the screws 44 and 46, the intermediate portion of the belt 42 is wound around the pulley 108 in an α shape and solidly secured to the pulley 108 through a screw 110. Furthermore, the belt 42 is formed therein with the slits 47 at regular intervals similarly to the preceding embodiment. In this embodiment with the above-described arrangement, rotation of the DC motor 104 causes the head carriage 34 to move along the guide bars 36 and 38, and the value and direction of the movement thereof can be read from the movement of the slits 47 similarly to the preceding embodiment.

In the preceding embodiment, the slits 47 provided in the belt 42 have been configured for use in a light transmission type of sensor system. However, the slits 47 may be configured for use in a reflection type of sensor system, or may be replaced by any other scale, such as for example, a magnetic scale. The slits 47 may be replaced by an optical sensor and an electric sensor only if the sensors are configured as linear sensors.

As has been described hereinabove, in the magnetic recording or reproducing device according to the present invention, marks are provided on the belt for driving the head carriage at regular intervals and the movement value of the marks is read to detect the movement value of the head carriage, so that the movement value of the magnetic head can be detected with high accuracy using simplified apparatus.

It should be understood, however, that there is no intention to limit the invention to the specific forms disclosed. To the contrary, the invention is to cover all modifications, alternate constructions and equivalents falling within the spirit and scope of the invention as expressed in the appended claims.

What is claimed is:

1. A magnetic recording or reproducing device with which image information can be magnetically recorded onto or reproduced from a magnetic disk contained in a magnetic disk pack comprises:
   a head carriage provided with a magnetic head and supported by guide members so as to be moveable along said guide members; and
   means for moving said head carriage comprising a substantially planar belt mounted on said head carriage so as to extend in the moving direction of said head carriage, a shaft member disposed in unwrapped contact with a first side of said belt and connected to a rotary driving source, and a roller disposed at a position opposed to said shaft member on a second opposite side of said planar belt and urged against said belt and shaft in unwrapped contact therewith.

2. A magnetic recording or reproducing device as set forth in claim 1, wherein said head carriage is formed with a recess in which said shaft member is positioned.

3. A magnetic recording or reproducing device as set forth in claim 2, wherein said shaft member is shifted in position toward said pressure roller to bias said head carriage against said guide members.

4. A magnetic recording or reproducing device as set forth in claim 3, further comprising marks disposed on said belt marks at regular predetermined intervals, and sensor means for detecting movement of said marks.

5. A magnetic recording or reproducing device as set forth in claim 4, wherein said marks comprise a plurality of slits formed at regular predetermined intervals on said belt.

6. A magnetic recording or reproducing device as set forth in claim 5, wherein said sensor means comprises:
   a light emitting element;
   a fixed slit plate provided with slits formed at regular predetermined intervals; and
   light receiving elements for receiving the light emitted from said light emitting element and transmitted through the slits of said belts and the slits of said fixed slit plate.

* * * * *